United States Patent [19]

Arakawa

[11] Patent Number: 4,763,281

[45] Date of Patent: Aug. 9, 1988

[54] RECORDING SYSTEM COMPRISING A RECORDING APPARATUS AND/OR AN INFORMATION STORAGE CARTRIDGE DETACHABLY ATTACHED TO THE RECORDING APPARATUS

[75] Inventor: Junichi Arakawa, Yokohama, Japan

[73] Assignee: Canon Kabushiki Kaisha, Tokyo, Japan

[21] Appl. No.: 751,223

[22] Filed: Jul. 2, 1985

[30] Foreign Application Priority Data

Jul. 9, 1984 [JP] Japan ................. 59-141654

[51] Int. Cl.⁴ .................... G06F 9/00; B41B 25/26; G06K 15/20

[52] U.S. Cl. ................. 364/523; 340/735; 400/61

[58] Field of Search ........... 364/523; 340/735; 400/61, 69, 121, 149.2, 166; 235/432; 360/10.1

[56] References Cited

U.S. PATENT DOCUMENTS

| | | | |
|---|---|---|---|
| 3,638,216 | 1/1972 | Brewster | 340/735 |
| 4,121,228 | 10/1978 | Cowe et al. | 340/735 |
| 4,217,055 | 8/1980 | Moon | 400/166 |
| 4,229,794 | 10/1980 | Foster | 235/432 |
| 4,316,188 | 2/1982 | Cancasci, Jr. | 340/735 |
| 4,594,674 | 6/1986 | Boulia et al. | 364/523 |

FOREIGN PATENT DOCUMENTS

| | | | |
|---|---|---|---|
| 57-142372 | 9/1982 | Japan | 400/61 |
| 59-41051 | 3/1984 | Japan | 340/735 |
| 59-87190 | 5/1984 | Japan | 400/61 |
| 59-91540 | 5/1984 | Japan | 340/735 |

OTHER PUBLICATIONS

Ludeman: Extended Audio-Video System, IBM Technical Disclosure Bulletin vol. 19, No 5, pp. 1546-1547. Oct. 1976.

*Primary Examiner*—Felix D. Gruber
*Attorney, Agent, or Firm*—Fitzpatrick, Cella, Harper & Scinto

[57] ABSTRACT

A recording system including a recording apparatus and an information storage cartridge detachably attached to the recording apparatus. The information storage cartridge includes a first memory in which a first group of dot patterns adapted to be recorded by the recording apparatus are stored. The cartridge also includes a mechanism for manually selecting whether the first dot pattern is to be recorded when the cartridge is attached to the recording apparatus. The recording apparatus includes a recording device for recording on a recording medium, a second memory for storing a second group of dot patterns adapted to be recorded by the recording apparatus, and a control device for actuating the recording device to effect recording of the second group of dot patterns when the information storage cartridge is not attached to the apparatus. Further, the control device also discriminates the state of the selecting mechanism when the information storage cartridge is attached to the recording apparatus. In addition, the control device determines which of the first and second group of dot patterns are recorded in accordance with the state of the selecting means.

18 Claims, 7 Drawing Sheets

RECORDING SYSTEM COMPRISING A RECORDING APPARATUS AND/OR AN INFORMATION STORAGE CARTRIDGE DETACHABLY ATTACHED TO THE RECORDING APPARATUS

BACKGROUND OF THE INVENTION

1. Field of the Invention

The present invention relates to a recording system in which additional pattern information other than those stored in the recording apparatus can be added by detachably attaching information memory means to the recording apparatus.

2. Description of the Prir Art

In usual printers, the recording of letters and symbols, hereinafter collectively called characters, is achieved by forming a group of dots on a sheet by activating a printing head according to dot information specifically correcponding to each character. The dot formation is achieved for example by a thermal recording method utilizing heat generation by resistors, an ink jet recording method utilizing ink emission from nozzles, or a wire dot recording method in which wire ends strike the recording sheet.

The characters are present in various styles such as gothic, Italic, courier etc., and the change of type style is often required in recording.

Conventionally, the style selection is achieved by storing data of plural styles of a same character in a read-only memory and by reading, when a change in print style is required, data of a desired style through a change in the program.

In such conventional method, however, printing other than in a standard style, requiring a change in the program or the use of a different program, is rather tedious and is not available to those not familar with the software.

Also, the printer, connected as an output unit to a host computer or the like, has been designed to receive code data supplied from such host computer and convert the code data by a character generator into character patterns for recording by the recording head. Consequently code data cannot be recorded if the corresponding character pattern is not stored in the character generator. Such drawback can be prevented by increasing the memory capacity of the character generator, but such increased memory capacity significantly elevates the cost of the printer.

SUMMARY OF THE INVENTION

An object of the present invention is to provide a recording system and a recording apparatus capable of recording a larger number of patterns without increasing the memory capacity of the patterns in the recording apparatus.

Another object of the present invention is to provide a recording system capable of changing the form of patterns to be recorded through a simple manual operation.

The foregoing and still other objects of the present invention will become fully apparent from the following description.

BRIEF DESCRIPTION OF THE DRAWINGS

FIG. 8A is a chart showing the content of a character generator in the printer;

FIG. 8B is a chart showing the content of a character generator in the cartridge.

DETAILED DESCRIPTION OF THE PREFERRED EMBODIMENTS

In the following there will be given an explanation on a first embodiment of the present invention, while making reference to FIGS. 1 to 4.

Figure 1:
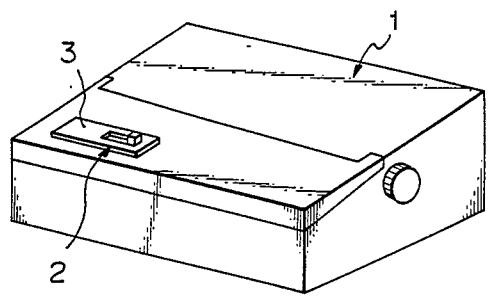
FIG. 1 is a perspective view of a printer embodying the present invention.
Figure 2:
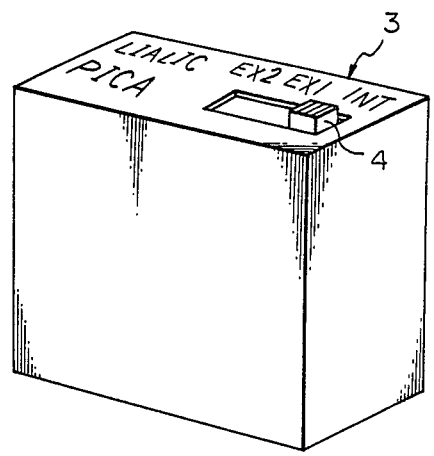
FIG. 2 is a perspective view of a font cartridge to be mounted on the printer shown in FIG. 1.

FIG. 1 illustrates a printer 1, of which a cartridge receptacle 2 detachably receives a font cartridge 3 as shown in FIG. 2. The printer 1 and the cartridge 3 constitute a recording system capable of varying the recording font.

A read-only memory (ROM) 8 of the printer 1 stores dot pattern data for example of gothic type style as a standard character set, while a ROM in the font cartridge 3 stores dot pattern data of plural type styles, such as Italic and other decorative type styles, as optional character sets. In the following there will be explained a case of two optional character sets, referred to as the optional set 1 and optional set 2.

In the standard character set (hereinafter simply called the standard set) and in these optional sets, mutually corresponding addresses store dot pattern information of a same character, mutually different in style.

The above-mentioned cartridge 3 is provided with a manual selector switch 4.

Figure 3:
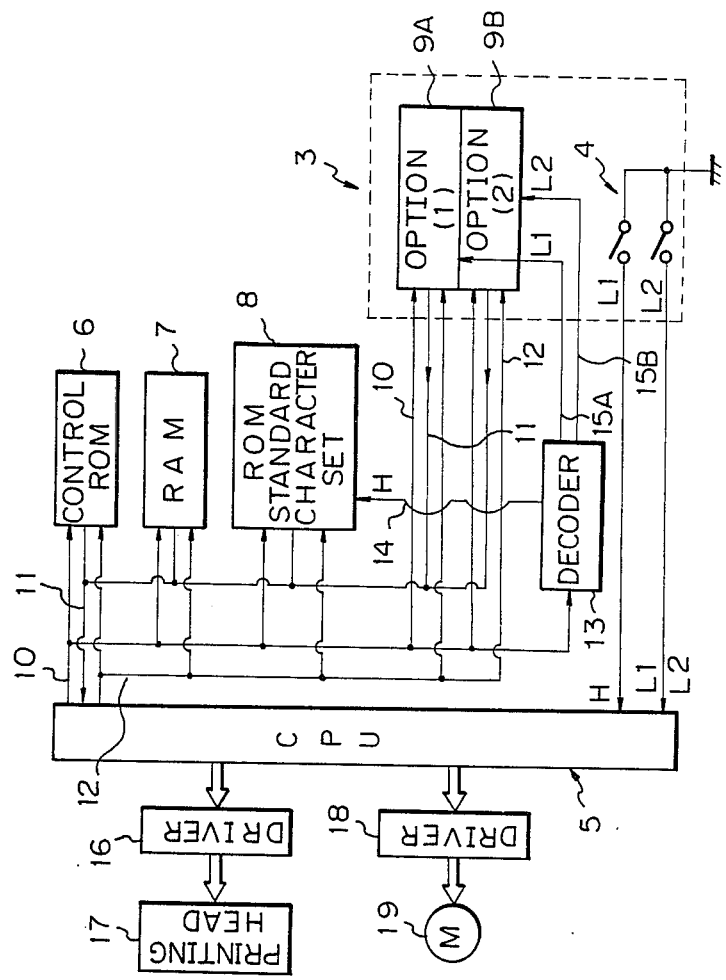
FIG. 3 is a block diagram showing an example of a font selector device according to the present invention.

FIG. 3 shows a control circuit of a font selecting device, in which the selector switch 4 of the font cartridge 3 selects one of the high (H), low (L1) and low 2 (L2) positions to send a corresponding signal to a central processing unit (CPU) 5, thus enabling to arbitrarily select one of three styles, i.e. the standard style and two optional styles.

The CPU 5 is connected, through an address signal line 10, a data signal line 11 and a command signal line 12, to a control ROM 6, a RAM 7, a standard set 8, a first optional set 9A and a second optional set 9B. The address signal line 10 is further connected to a decoder 13 which is in turn connected to the character sets 8, 9A, 9B respectively through select signal lines 14, 15A, 15B.

The CPU 5 supplies control signals to a print head driver 16 for driving a printing head 17 and control signals to a motor driver 18 for activating a motor 19 for driving a carriage, a sheet advancing mechanism etc., thereby forminga record on a recording sheet.

In the above-described circuit structure, when the selector switch 4 is in a position INT in FIG. 2, wherein the contacts L1 and L2 are both open, the decoder 13 decodes the signals from the CPU 5 and reads the data from the standard set 8 according to the address signals and in synchronization with signals READ supplied through the command signal line 12, whereby the recording is obtained with a standard style, for example gothic style When the selector switch 4 is at position EX1 in FIG. 2, where the contact L1 is closed but the other contact is open, the decoder 13 decodes the signals similarly and reads the data of the same address from the first optional set 9A in synchronization with the signals READ from the command signal line 12 whereby the recording is obtained with a first optional style, for example Italic.

When the selector switch 4 is at a position EX2 in FIG. 2, where the contact L2 is closed but the other contact is open, the decoder 13 decodes the signals similarly and reads the data of the same address from the second optional set 9B in synchronization with the signal READ from the command signal line 12 whereby the recording is obtained with a second optional style, for example a decorative style.

In case the font cartridge 3 is removed, the recording is obtained with the style of the standard set 8, since both contacts L1, L2 are opened.

Figure 4:
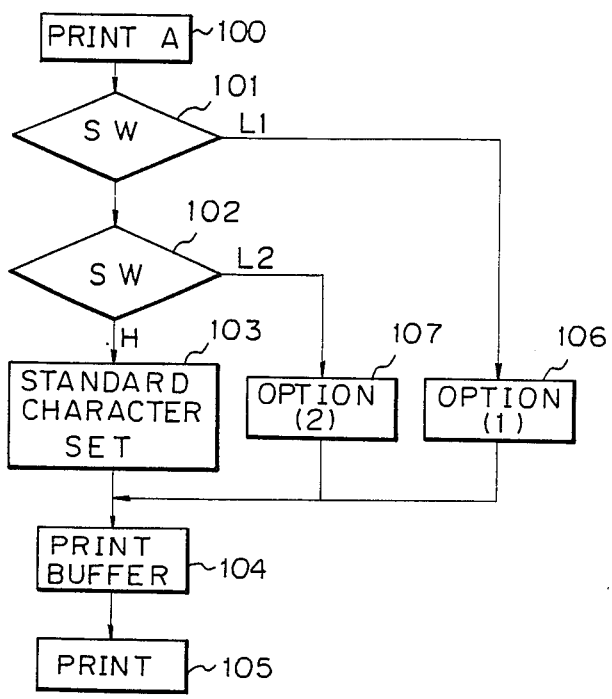
FIG. 4 is a flow chart showing the operation sequence of the device shown in FIG. 3.

FIG. 4 shows the operation procedure in case of printing, for example, a character "A". In response to a command for printing the character "A" from a keyboard in a step 100, a next step 101 discriminates whether the selector switch 4 selects the state L1. If not, the program proceeds to a step 102 to discriminate whether a state H or L2 is selected. If the state H is selected, a step 103 is executed to read the data of the character "A" in the standard style from the standard set 8.

On the other hand, if the step 101 identifies that the switch 4 is positioned at L1, the program proceeds to a step 106 for reading the data from the first optional set 9A.

Also in case the step 102 identifies that the switch 4 is positioned at L2, the program proceeds to a step 107 for reading the data from the second optional set 9B.

The data thus read are temporarily stored, in a step 104, in a print buffer, usually formed in a part of the RAM.

The foregoing procedure is repeated for the characters consecutively designated by the keyboard or an external memory and the read data are stored in succession in the print buffer (step 104), and the program proceeds to a step 105 when the stored data reach a determined amount, for example corresponding to a line, to print the data.

The recording is thus achieved by repeating the above-described procedure.

The above-described apparatus allows to read the data arbitrarily from any of the standard set 4 and plural optional sets 9A, 9B according to the selection by the selector switch 4, so that the type font can be easily changed in the same program, merely through a simple manual switch operation.

Though the foregoing embodiment employs two optional sets, the present invention is applicable also to a case employing three or more optional sets.

Figure 5:
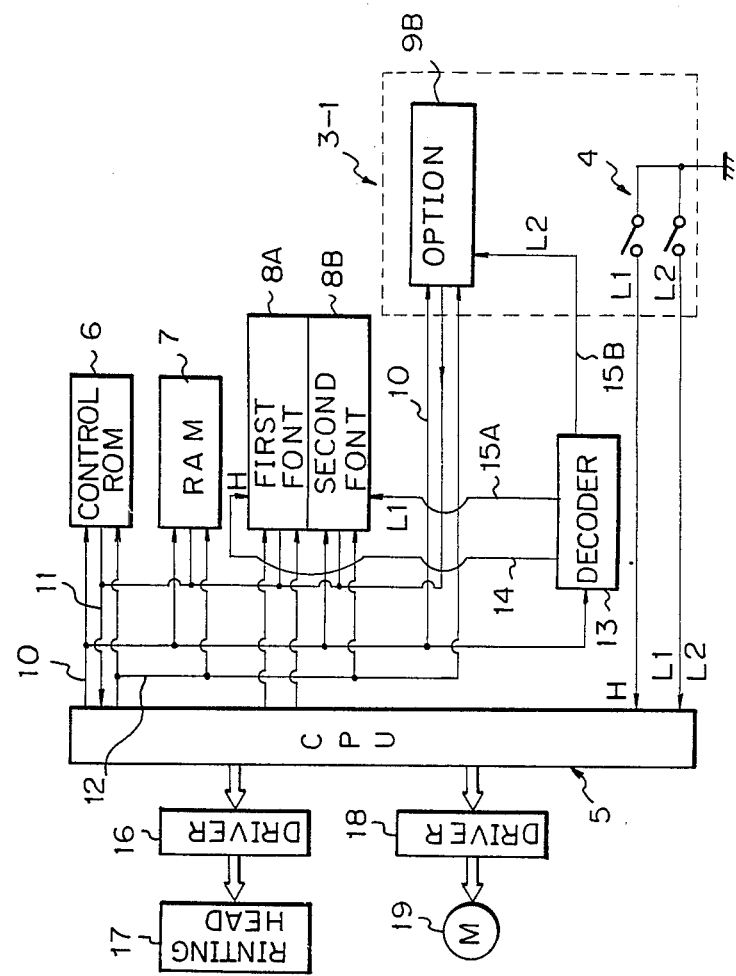
FIG. 5 is a block diagram of a printer constituting a second embodiment of the present invention.
Figure 6:
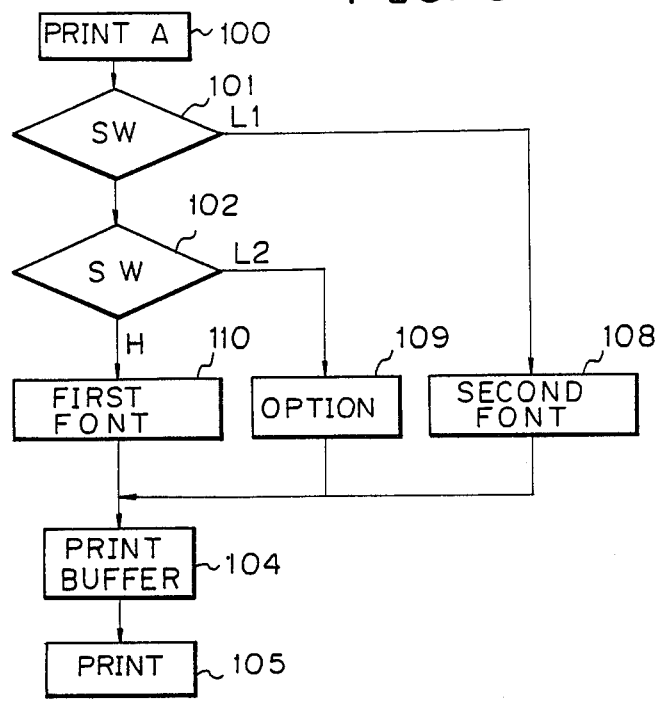
FIG. 6 is a flow chart showing the operation sequence of the apparatus shown in FIG. 5.

FIGS. 5 and 6 show a second embodiment of the present invention, in which the standard set consists of a first font 8A storing the dot pattern data of gothic style, and a second font 8B storing the dot pattern data of Italic style. On the other hand the ROM in the font cartridge has an optional set 9B storing dot pattern data of a decorative style.

The function of the above-described apparatus is essentially same as that of the first embodiment, but a step 108 is executed in case the selector switch 4 is positioned at L1 to read the patterns of the Italic style from the second font 8A, while a step 109 is executed in case the selector switch 4 is positioned at L2 to read the patterns of the decorative style from the optional set 9B, and a step 110 is executed in case the selector switch 4 is positioned at H to read the patterns of the gothic style from the first font 8A, for supply to the printing head 17.

Figure 7:
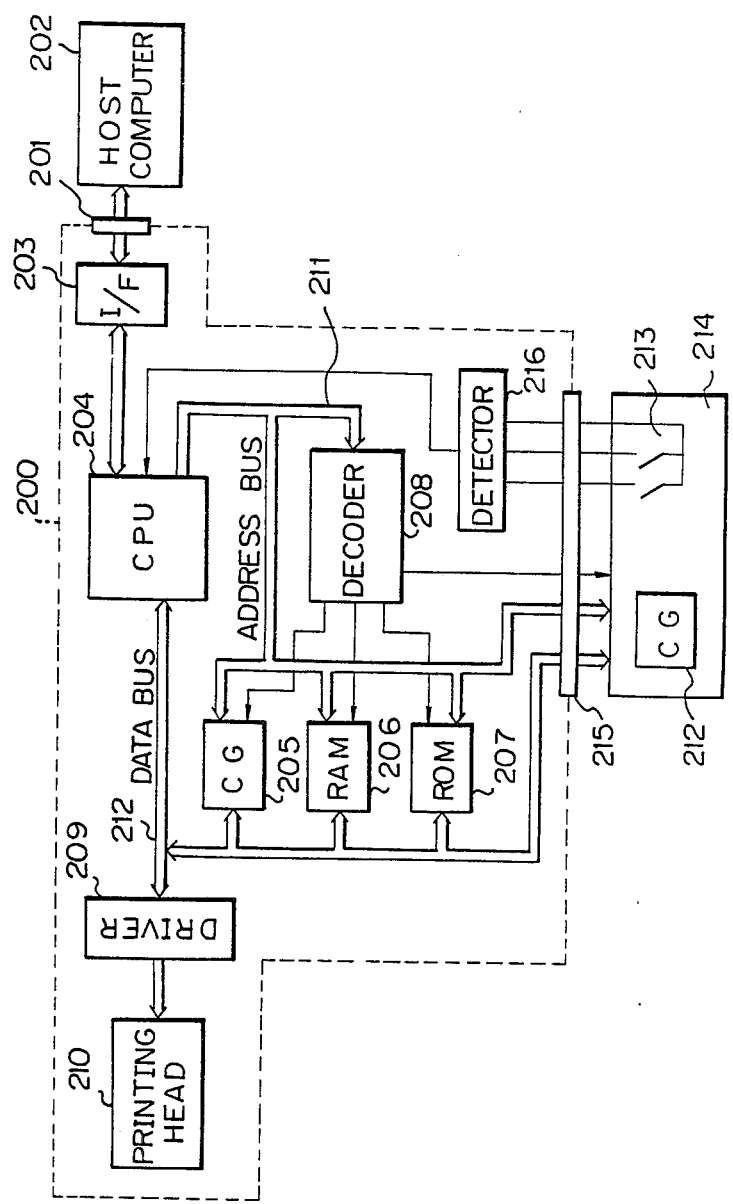
FIG. 7 is a block diagram of a third embodiment.

FIG. 7 shows a third embodiment of the present invention, in which a printer 200 is connected, through a connector 201, to a host computer 202 constituting an external apparatus. The host computer 202 releases the data to be recorded in succession in the form of code data, which are received by an interface 203 of the printer 200 through the connector 201. A central processing unit (CPU) 204 of the printer controls a character generator 205 storing character patterns in a read-only memory, a RAM 206, a ROM 207, a decoder 208 etc. in response to commands of the host computer 202 received through the interface 203, thereby driving a recording head 210 through a driver 209 and forming a record on a recording sheet. More specifically, the ROM 207 stores a control procedure for the printer, according to which the CPU 204 controls the entire printer. In response to code data supplied from the host computer 202, the CPU 204 designates, through an address bus 211, an address in the character generator 205 to release a determined character dot pattern, which is temporarily stored in the RAM 206. The dot pattern data in said RAM 206 are transferred to the driver 209 which is controlled by the CPU 204 through the data bus 212, and are applied to the recording head 210 in appropriate timing for recording dot patterns.

On the printer 200 there is detachably attached, by means of a connector 215, a memory cartridge 214 which is provided with a character generator 212 storing data different from those in the character generator 205, for example data for graphic recording, and a switch 213 indicating the data stored in the character generator 212. The switch 213 cannot be operated from the outside but is suitably positioned in advance according to the species of the data stored in the character generator 212. When the memory cartridge 214 is mounted on the connector 215, a detector 216 of the printer detects the state of the switch, whereby the CPU 204 can identify the species of the mounted memory cartridge.

FIG. 8A shows the content of the character generator 205 in the printer, and FIG. 8B shows the content of the character generator 212 of the memory cartridge 214 mounted on the connector 215. As will be understood from the illustration, mutually corresponding addresses of these character generators store entirely different pattern data.

Figure 9:
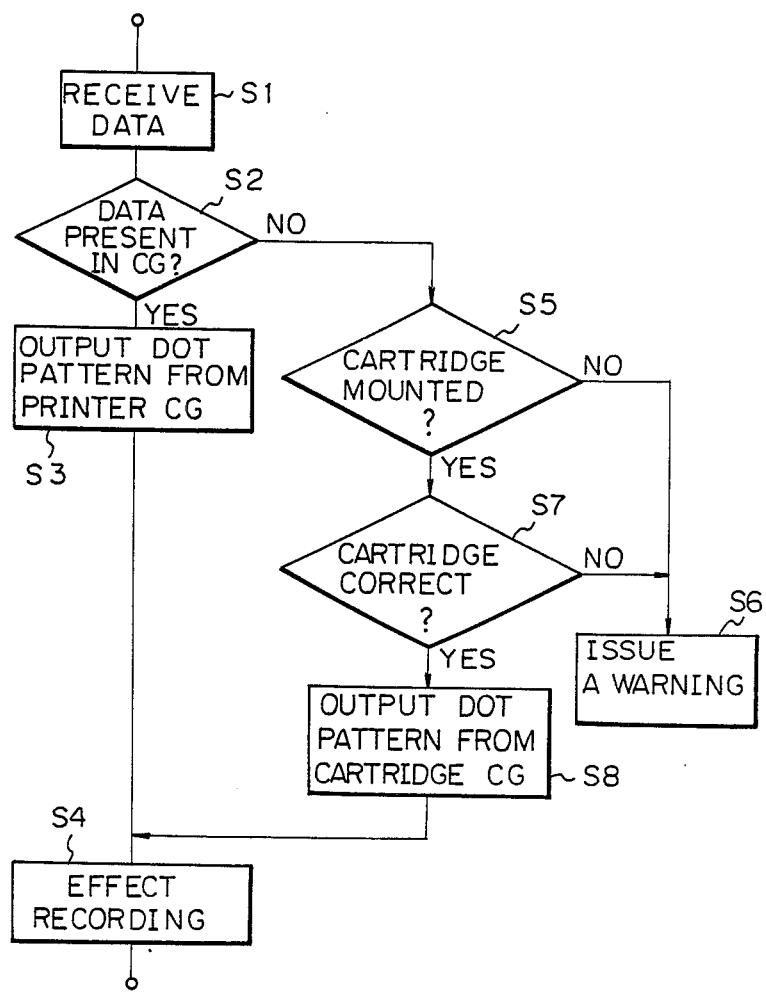
FIG. 9 is a flow chart showing the operation sequence of the apparatus shown in FIG. 7.

Now reference is made to FIG. 9 for explaining the function of the foregoing embodiments. At first the CPU 204 receives, in a step S1, data to be recorded from the host computer 202, and identifies, in a step S2, whether pattern data corresponding to thus received data are present in the character generator 205. If present, it causes, in steps S3, and S4, the character generator to release the corresponding dot pattern and the recording head 210 to record the dot pattern.

On the other hand, in case the pattern corresponding to the data received from the host computer 202 are not present in the character generator 205, a step S5 discriminates whether the memory cartridge 214 is mounted on the connector 214. If not, the CPU 204 advises the host computer 202 through the connector 201, in a step S6, that the recording is not possible. On the other hand, if the memory cartridge is mounted on the connector 215, a step S7 discriminates whether the mounted cartridge contains pattern data corresponding to the code data previously received from the host computer. In case such pattern data are not present, the program proceeds to a step S6 for providing a warning. On the other hand, if such pattern data are present, a step S8 activates the character generator 212 in the cartridge to release the dot pattern, which is printed by the recording head 210 in a step S4. The selection of the character generator 205 or the character generator 212 in the cartridge 214 is made by the CPU 204 through the decoder 208.

In the foregoing embodiments the memory cartridge 214 stores symbols for graphic recording, but it may also contain special characters such as Chinese or Greek characters. It is also possible to store plural groups of patterns in the cartridge and select one of these groups by a manual switch.

What is claimed is:

1. A recording system comprising:
   a recording apparatus; and
   an information storing cartridge detachably attached to the recording apparatus, wherein said information storing cartridge includes:
   first memory means having stored therein a first group of dot patterns; and
   means for manually determining whether data is recorded using said first group of dot patterns when said cartridge is attached to said recording apparatus, wherein said determining means comprises switching means; and
   wherein said recording apparatus includes:
   recording means for recording on a recording medium;
   second memory means storing a second group of dot patterns; and
   controlling means for actuating said recording means to effect recording of data using said second group of dot patterns of said second memory means when said information storing cartridge is not attached to said recording apparatus, and for discriminating the state of said switching means and to effect recording of data using said first group of dot patterns or said second group of dot patterns by said recording means in accordance with the tate of said switching means when said information storing cartridge is attached to said recording apparatus.

2. The recording system according to claim 1, wherein said information storing cartridge includes third memory means for storing a third group of dot patterns, and wherein said switching means determines which of said first, second, and third groups of dot patterns is used to record said data.

3. The recording system according to claim 2 wherein one of said groups of dot patterns comprises a character font.

4. The recording system according to claim 1 wherein one of said groups of dot patterns comprises a character font.

5. A recording system comprising:
   a recording apparatus; and
   an information storing cartridge detachably attached to said recordng apparatus, wherein said information storing cartridge includes:
   first memory means having stored therein a first dot pattern group;
   second memory means having stored therein a second dot pattern group; and
   means for manually determining which of said first dot pattern group and said second dot pattern group is used to record data when said information storing cartridge is attached to said recording apparatus, wherein said determining means comprises switching means; and
   wherein said recording apparatus includes:
   recording means for recording on a recording medium; and
   controlling means for discriminating the state of said switching means and to effect recording of data using the dot patterns designated by said switching means when said information storing cartridge is attached to said recording apparatus.

6. The recording system according to claim 5, wherein said recording apparatus includes third memory means having stored therein a third dot pattern group, and wherein said switching means determines which of said first, second and third dot patterns is used to record data.

7. The recording system according to claim 6 wherein one of said dot pattern groups comprises a character font.

8. The recording system according to claim 5, wherein one of said dot pattern groups comprises a character font.

9. A recording apparatus to which an information storing cartridge is adapted to be detachably attached, wherein said information storing cartridge is provided with first memory means having stored therein a first dot pattern group, and means for manually determining whether said first dot pattern group is used to record data, wherein said determining means comprises switching means, wherein said recording apparatus comprises:
   recording means for recording on a recording medium;
   second memory means having stored therein a second dot pattern group;
   a signal line connected to said first memory means and said switching means when said information storing cartridge is attached to said recording apparatus; and
   controlling means for effecting recording of data using said second dot pattern group by said recording means when said information storing cartridge is not attached to said recording apparatus, and to discriminate the state of said switching means and to effect recording of data using said first or second dot pattern groups by said recording means in accordance with the state of said switching means when said information storing cartridge is attached to said recording apparatus.

10. The recording apparatus according to claim 9, wherein said recording apparatus includes third memory means having stored therein a third dot pattern group, and wherein said switching means determines which one of said first, second and third dot patterns is used to record data.

11. The recording apparatus according to claim 10, wherein one of said dot pattern groups is a character font.

12. A recording apparatus according to claim 9, wherein said information storing cartridge includes third memory means having stored therein a third dot pattern group, and wherein said switching means determines which one of said first, second and third dot patterns is used to record data.

13. A recording apparatus according to claim 12, wherein one of said dot pattern groups is a character font.

14. A recording apparatus to which an information storing cartridge is adapted to be detachably attached, wherein said information storing cartridge comprises first memory means having stored therein a first dot pattern group, second memory means having stored therein a second dot pattern group, and means for manually determining which of said first and second dot pattern groups is used to record data, wherein said determining means comprises switching means, wherein said recording apparatus comprises:
  recording means for recording on a recording medium;
  a signal line connected to said first memory means, said second memory means, and said switching means when said information storing cartridge is attached to said recording apparatus; and
  controlling means for discriminating the state of said switching means and to effect recording by said recording means of data using said first dot pattern group or said second dot pattern group in accordance with said state of said switching means when said information storing cartridge is attached to said recording apparatus.

15. The recording apparatus according to claim 14, wherein said recording apparatus includes third memory means having stored therein a third dot pattern group, and wherein said switching means determines which one of said first, second and third dot patterns is used to record data.

16. The recording apparatus according to claim 15, wherein one of said dot pattern groups is a character font.

17. The recording apparatus according to claim 14, wherein said information storing cartridge further includes third memory means having stored therein a third dot pattern group, and wherein said switching means determines which of said first, second and third dot patterns is used to record data.

18. The recording apparatus according to claim 17, wherein one of said dot pattern groups is a character font.

* * * * *

UNITED STATES PATENT AND TRADEMARK OFFICE
CERTIFICATE OF CORRECTION

PATENT NO. : 4,763,281
DATED : August 9, 1988
INVENTOR(S) : JUNICHI ARAKAWA

It is certified that error appears in the above-identified patent and that said Letters Patent is hereby corrected as shown below:

IN THE DRAWINGS

Sheet 4, Figure 5, "RINTING HEAD" should read --PRINTING HEAD--.

COLUMN 1

Line 15, "Prir" should read --Prior--.
    Line 20, "correcponding" should read --corresponding--.

COLUMN 2

Line 45, "low (L1)" should read --low 1 (L1)--.
    Line 62, "forminga" should read --forming a--.

COLUMN 3

Line 52, "standard set 4" should read --standard set 8--.

COLUMN 4

Line 50, "printer," should read --printer 200,--.

COLUMN 5

Line 1, "connector 214." should read --connector 215.--.
    Line 51, "tate" should read --state--.

UNITED STATES PATENT AND TRADEMARK OFFICE
CERTIFICATE OF CORRECTION

PATENT NO. : 4,763,281
DATED : August 9, 1988
INVENTOR(S) : JUNICHI ARAKAWA

It is certified that error appears in the above-identified patent and that said Letters Patent is hereby corrected as shown below:

COLUMN 6

Line 2, "recordng" should read --recording--.

Signed and Sealed this

Eleventh Day of April, 1989

Attest:

DONALD J. QUIGG

Attesting Officer

Commissioner of Patents and Trademarks